United States Patent [19]

Eilingsfeld et al.

[11] 4,327,019
[45] Apr. 27, 1982

[54] ACID AZO DYES FROM A 3-AMINO-BENZISOTHIAZOLE-[2,1]-5-SULFONIC ACID DIAZO COMPONENT

[75] Inventors: Heinz Eilingsfeld, Frankenthal; Guenter Hansen; Guenther Seybold, both of Ludwigshafen; Georg Zeidler, Limburgerhof, all of Fed. Rep. of Germany

[73] Assignee: BASF Aktiengesellschaft, Fed. Rep. of Germany

[21] Appl. No.: 973,800

[22] Filed: Dec. 28, 1978

Related U.S. Application Data

[63] Continuation of Ser. No. 757,431, Jan. 6, 1977, abandoned.

[30] Foreign Application Priority Data

Jan. 17, 1976 [DE] Fed. Rep. of Germany ....... 2601603

[51] Int. Cl.³ .................. C07C 107/04; C09B 29/039; C09B 29/095
[52] U.S. Cl. ...................................... 260/158; 260/154
[58] Field of Search ......................................... 260/158

[56] References Cited

U.S. PATENT DOCUMENTS

| 3,657,220 | 4/1972 | Kilmurry | 260/207.1 X |
| 3,676,050 | 7/1972 | James | 260/186 X |
| 3,943,121 | 3/1976 | Maner et al. | 260/158 |
| 4,657,220 | 4/1972 | Kilmurray | 260/207.1 X |

FOREIGN PATENT DOCUMENTS

| 2222639 | 11/1972 | Fed. Rep. of Germany | 260/158 |
| 2332644 | 1/1975 | Fed. Rep. of Germany | 260/158 |
| 2413169 | 10/1974 | Fed. Rep. of Germany | 260/158 |
| 468443 | 3/1969 | Switzerland | 260/158 |
| 1466586 | 3/1977 | United Kingdom | 260/158 |

OTHER PUBLICATIONS

Venkataraman, *The Chemistry of Synthetic Dyes*, vol. I, Academic Press, Inc., New York, 1952, p. 270.

Primary Examiner—Charles F. Warren
Attorney, Agent, or Firm—Keil & Witherspoon

[57] ABSTRACT

Acid monoazo dyes of the formula

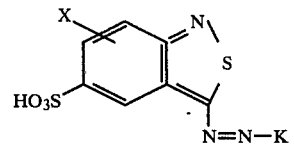

in which X is hydrogen, chloro, bromo, nitro, $C_1$ to $C_4$ alkyl, methoxy, ethoxy or $C_2$ to $C_4$ alkanoylamino and K is a radical of a coupling compound as defined below. The dyes are suitable for dyeing natural or synthetic polyamides giving colorations with very good fastness properties.

7 Claims, No Drawings

ACID AZO DYES FROM A 3-AMINO-BENZISOTHIAZOLE-[2,1]-5-SULFONIC ACID DIAZO COMPONENT

This is a continuation, of application Ser. No. 757,431, filed Jan. 6, 1977 now abandoned.

The invention relates to compounds which in the form of the free acids have the formula (I):

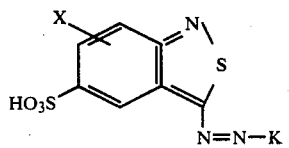

in which

X is hydrogen, chloro, bromo, nitro, $C_1$ to $C_4$ alkyl, methoxy, ethoxy or NHCO-alkyl, the alkyl being $C_1$ to $C_4$;

K is a radical of the formula:

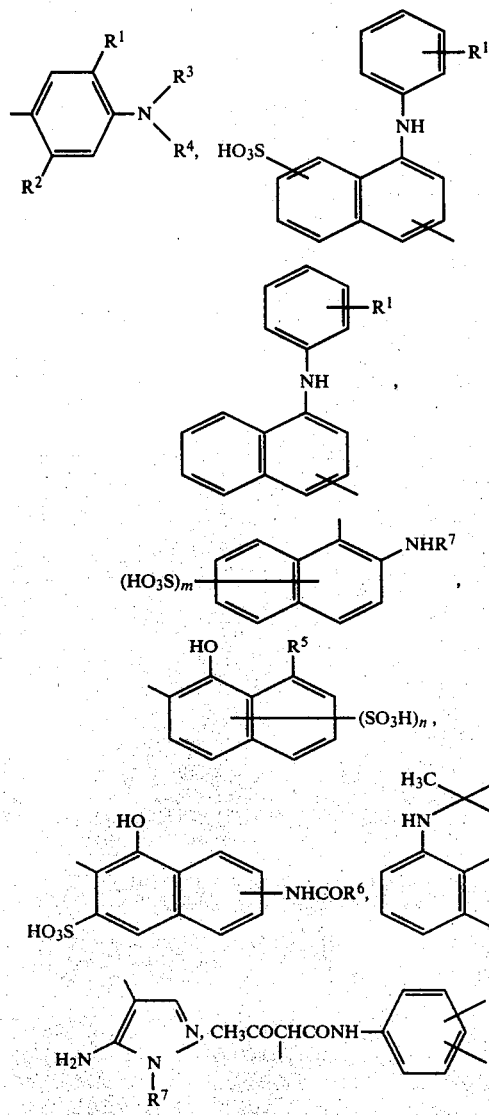

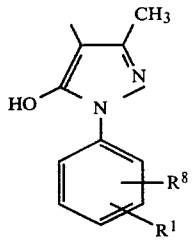

$R^1$ is hydrogen, chloro, methyl, methoxy or ethoxy;

$R^2$ is hydrogen, chloro, methyl, ethyl, benzyl, sulfobenzyl, methoxy, ethoxy, carboxy, NHCO-($C_1$ to $C_4$ alkyl), NHCOCH$_2$Cl, NHCOCHCl$_2$, NHCONH$_2$ or SO$_3$H;

$R^3$ is hydrogen, $C_1$ to $C_4$ alkyl, $C_2$ or $C_3$ hydroxyalkyl or dihydroxyalkyl, $\beta$-sulfoethyl, $\gamma$-sulfopropyl, $\beta$-cyanoethyl, $\beta$-hydroxy-$\gamma$-chloropropyl, $C_1$ to $C_4$ alkoxyethyl, acetoxyethyl, $\beta$-chloroethyl, $\gamma$-aminopropyl, $\gamma$-acetylaminopropyl, $\beta$-carboxyethyl, $\beta$-carbamoylethyl, benzyl, sulfobenzyl, phenylethyl, sulfophenylethyl or cyclohexyl;

$R^4$ is $C_1$ to $C_4$ alkyl, $C_2$ or $C_3$ hydroxyalkyl, $\beta$-cyanoethyl, $\beta$-chloroethyl, $C_1$ to $C_4$ alkoxyethyl, benzyl or sulfobenzyl;

$R^5$ is amino, acetylamino, chloroacetylamino, phenoxyacetylamino, benzoylamino, chlorobenzoylamino or dichlorobenzoylamino;

$R^6$ is methyl, chloromethyl, phenyl, chlorophenyl or acetylamino;

$R^7$ is $C_1$ to $C_8$ alkyl, $C_2$ or $C_3$ hydroxyalkyl, phenyl-($C_1$ to $C_4$ alkyl), cyclohexyl or phenyl;

$R^8$ is hydrogen, chloro, methyl, methoxy or hydroxysulfonyl;

m is zero, 1 or 2; and n is 1 or 2.

Examples of individual radicals X in addition to those already specified are: CH$_3$, C$_2$H$_5$, C$_3$H$_7$, C$_4$H$_9$, NHCOCH$_3$, NHCOC$_2$H$_5$, NHCOC$_3$H$_7$ and NHCOC$_4$H$_9$.

Examples of individual alkyl and alkoxyalkyl radicals for $R^3$ and $R^4$ are: CH$_3$, C$_2$H$_5$, C$_3$H$_7$, C$_4$H$_9$, C$_2$H$_4$OCH$_3$, C$_2$H$_4$OC$_2$H$_5$, C$_2$H$_4$OC$_3$H$_7$ and C$_2$H$_4$OC$_4$H$_9$.

Examples of $R^7$ in addition to those already specified are: CH$_3$, C$_2$H$_5$, C$_3$H$_7$, C$_4$H$_9$, C$_5$H$_{11}$, C$_6$H$_{13}$, C$_8$H$_{17}$,

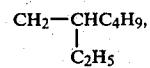

C$_6$H$_5$CH$_2$, C$_6$H$_5$C$_2$H$_4$,

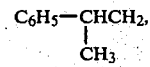

C$_6$H$_5$C$_3$H$_6$ and C$_6$H$_5$C$_4$H$_8$.

Compounds of the formula (I) may be prepared by reacting a diazo compound of an amine of the formula (II):

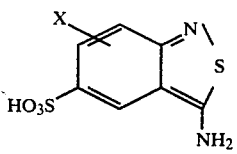 (II)

with a coupling component of the formula (III):

HK      (III)

in which X and K have the meanings given above.

Particular industrial importance attaches to compounds of the formula (Ia):

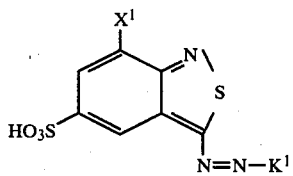 (Ia)

in which
X¹ is hydrogen, chloro or bromo; and
K¹ is a radical of the formula

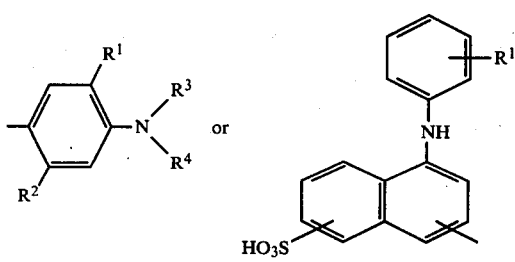

Preferred radicals are therefore:
for R² hydrogen, methyl, chloro, acetylamino or SO₃H;
for R³ and R⁴ C₁ to C₄ alkyl, C₂H₄OH, CH₂CHOHCH₃, CH₂CHOHCH₂OH, CH₂—CH₂—OCOCH₃, CH₂CH₂Cl, CH₂CH₂CN, CH₂CHOHCH₂Cl, CH₂CH₂OCH₃, C₂H₄OC₂H₅, C₃H₆NHCOCH₃ or CH₂C₆H₄SO₃H; and for R¹ hydrogen, methoxy or methyl.

Dyes of the formula (I) are red to greenish blue and are particularly suitable for the coloration of natural and synthetic polyamides such as wool, nylon-6, nylon-6,6 and furs.

Dyeings are obtained having very good fastness properties of which fastness to light and wet treatments such as fastness to washing, water, perspiration, fulling and sea water are to be emphasized. The dyes moreover have a very high color strength. In the case of fur dyeing the dyes have good fastness to hot pressing and can be combined to produce brown and black shades.

The following Examples illustrate the invention. The parts and percentages are by weight unless otherwise stated.

EXAMPLE 1

23 parts of 3-aminobenzoisothiazole-5-sulfonic acid is dissolved in 200 parts of water with 4.8 parts of caustic soda, a solution of 6.9 parts of sodium nitrite in water is added and the whole is dripped into a mixture of 200 parts of ice and 46.4 parts of 32% hydrochloric acid while stirring. The suspension of the diazonium salt is stirred for about one hour at 0° to 5° C. and then the excess of nitrite is destroyed with a small amount of sulfamic acid. A solution of 21.63 parts of 3-(N,N-diethylamino)-acetylaminobenzene in 100 parts of water and 11.6 parts of 32% hydrochloric acid is added. After the whole has been stirred for about fifteen minutes the pH is adjusted to 4 to 5 with a solution of 57.5 parts of sodium acetate. The reaction mixture is further stirred until coupling is completed and the dye is then suction filtered and dried at 70° C. at subatmospheric pressure. A dark powder is obtained having the formula:

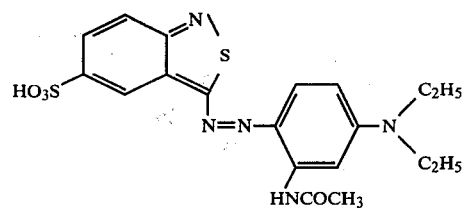

It is soluble in water to give a reddish blue color and gives reddish blue dyeings of good fastness properties on nylon 6, furs, wool and leather.

Dyes having similar tinctorial properties and set out in the following Table are prepared analogously to Example 1.

| No. | Diazo component | Coupling component | Hue on nylon 6 |
|---|---|---|---|
| 2 | | ₂) | blue |
| 3 | " | (C₂H₅)) | blue |
| 4 | " | ₂) | reddish blue |

-continued

| No. | Diazo component | Coupling component | Hue on nylon 6 |
|---|---|---|---|
| 5 | " | 2) | reddish blue |
| 6 | " | 3-OC2H5-phenyl-N(C2H5)2 | reddish blue |
| 7 | " | phenyl-N(C2H4CN)(C2H5) | reddish blue |
| 8 | " | 3-CH3-phenyl-N(C2H4CN)(C2H5) | reddish blue |
| 9 | " | 3-OCH3-phenyl-N(C2H4OCOCH3)2 | reddish blue |
| 10 | " | 2-OCH3-5-CH3-phenyl-N(C2H5)2 | blue |
| 11 | " | phenyl-N(C2H4Cl)(C2H5) | reddish blue |
| 12 | " | phenyl-N(C2H4OCH3)(C2H4CN) | reddish blue |
| 13 | " | phenyl-N(C2H4OCH3)(C2H5) | blue |
| 14 | " | phenyl-N(C2H4OCH3)(C2H4Cl) | reddish blue |
| 15 | " | phenyl-N(C2H5)(C2H4COOCH3) | reddish blue |
| 16 | " | phenyl-N(CH2-phenyl)(CH3) | blue |
| 17 | " | phenyl-N(C3H6—NH2)(C2H5) | reddish blue |
| 18 | " | phenyl-N(C3H6NHCOCH3)(C2H5) | violet |
| 19 | " | phenyl-N(C3H6NHCOCH3)(C3H7) | violet |
| 20 | " | 3-NHCOCH2-phenyl-N(C2H5)2 | reddish blue |

-continued

| No. | Diazo component | Coupling component | Hue on nylon 6 |
|---|---|---|---|
| 21 | " | 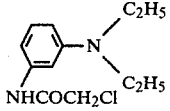 | violet |
| 22 | " | 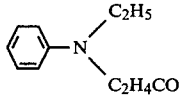 | violet |
| 23 | " | 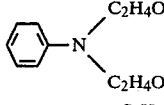 | reddish blue |
| 24 | " | 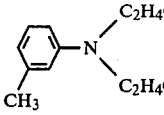 | reddish blue |
| 25 | " | 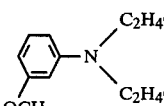 | reddish blue |
| 26 | " | 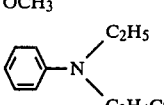 | violet |
| 27 | " | 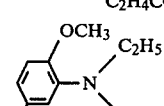 | greenish blue |
| 28 | " | 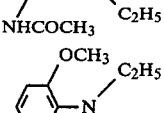 | dark blue |
| 29 | " | 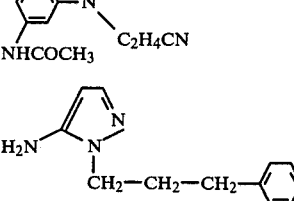 | red |

EXAMPLE 30

23 parts of 3-aminobenzoisothiazole-5-sulfonic acid is diazotized analogously to Example 1. A neutral solution of 24 parts of 3-(N,N-diethylamino)-benzenesulfonic acid in 100 parts of water is then added to the suspension of the diazonium salt. The mixture is then adjusted to a pH of 4 to 5 with sodium acetate and further stirred until the coupling is ended. The dye of the composition:

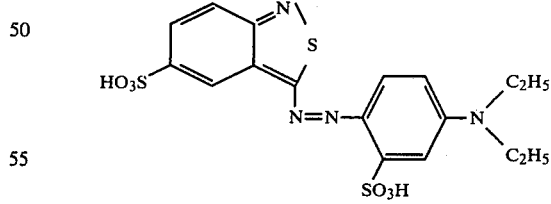

is salted out with 160 parts of sodium chloride, suction filtered and dried at 70° C. It dyes nylon 6, wool and fur fast reddish blue shades.

The dyes collected in the following Table may be prepared as described in Example 30; the coupling components of Examples 31 to 40 are dissolved in dilute hydrochloric acid.

| No. | Diazo component | Coupling component | Hue on nylon 6 |
|---|---|---|---|
| 31 | HO$_3$S—[benzisothiazole with NH$_2$] | phenyl-N(C$_2$H$_4$OH)(C$_2$H$_5$) | reddish blue |
| 32 | " | 3-methylphenyl-N(C$_2$H$_4$OH)(CH$_3$) | reddish blue |
| 33 | " | phenyl-N(C$_2$H$_4$OH)(C$_4$H$_9$) | reddish blue |
| 34 | " | phenyl-N(C$_2$H$_4$OH)(C$_2$H$_4$CN) | violet |
| 35 | " | 3-methoxyphenyl-N(C$_2$H$_4$OH)(C$_2$H$_5$) | reddish blue |
| 36 | " | 3-methylphenyl-N(C$_2$H$_4$OH)(C$_2$H$_5$) | reddish blue |
| 37 | " | 3-chlorophenyl-N(C$_2$H$_4$OH)(C$_2$H$_5$) | violet |
| 38 | " | phenyl-N(CH$_2$-CH(OH)-CH$_2$-OH)(C$_2$H$_5$) | reddish blue |
| 39 | " | phenyl-N(CH$_2$-CH(OH)-CH$_2$-Cl)(C$_4$H$_9$) | reddish blue |
| 40 | " | phenyl-N(CH$_2$-CH(OH)-CH$_2$-CN)(C$_2$H$_5$) | reddish blue |
| 41 | " | 3-sulfophenyl-N(CH$_3$)(CH$_3$) | reddish blue |
| 42 | " | phenyl-N(C$_2$H$_5$)(CH$_2$-CH$_2$-CH$_2$-SO$_3$H) | reddish blue |
| 43 | " | naphthyl(SO$_3$H)-NH-phenyl | greenish blue |
| 44 | " | naphthyl(SO$_3$H)-NH-(4-methylphenyl) | greenish blue |

-continued

| No. | Diazo component | Coupling component | Hue on nylon 6 |
|---|---|---|---|
| 45 | " | HO, NHCOCH₃ naphthalene with HO₃S and SO₃H | reddish blue |
| 46 | " | HO, NHCOCH₃ naphthalene with HO₃S and SO₃H | reddish blue |
| 47 | " | HO, NHCO-phenyl naphthalene with HO₃S and SO₃H | blue |
| 48 | " | HO, NHCO-phenyl naphthalene with HO₃S and SO₃H | reddish blue |
| 49 | " | HO, NHCO-(2,4-dichlorophenyl) naphthalene with HO₃S and SO₃H | reddish blue |
| 50 | " | OH, NHCH₃ naphthalene with HO₃S | blue |
| 51 | " | HO₃S, NHCOCH₃ naphthalene with HO | blue |
| 52 | " | phenyl-N(C₂H₅)(C₂H₄OSO₃H) | reddish blue |
| 53 | " | H₂N, OH naphthalene with CH₃, HO₃S, SO₃H | blue |
| 54 | " | HO, NH₂ naphthalene with SO₃H, SO₃H | reddish dark blue |
| 55 | " | phenyl-N(C₂H₅)(CH₂-C₆H₄-SO₃H) | violet |
| 56 | " | naphthalene with HO₃S and NH-phenyl | reddish blue |
| 57 | " | naphthalene with HO₃S and NHC₂H₅ | reddish blue |

-continued

| No. | Diazo component | Coupling component | Hue on nylon 6 |
|---|---|---|---|
| 58 | " | [structure: HO₃S-naphthalene-NH-cyclohexyl (H)] | reddish blue |

EXAMPLE 59

23 parts of 3-aminobenzoisothiazole-5-sulfonic acid is diazotized as described in Example 1 and an aqueous solution of 25 parts of 3-(N,N-dihydroxyethylamino)-acetylaminobenzene is added to the suspension of the diazonium salt. After coupling has taken place the dye solution is evaporated to dryness. The powder obtained which has the formula:

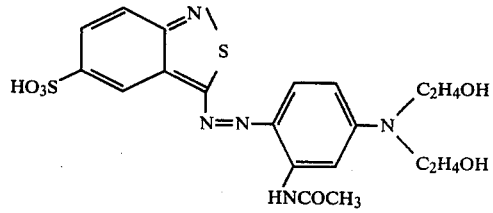

dyes nylon 6, wool and fur clear and fast dark blue hues.
The dyes comprised within the following Table may be prepared according to Example 59.

| No. | Diazo component | Coupling component | Hue on nylon 6 |
|---|---|---|---|
| 60 | [HO₃S-benzoisothiazole-NH₂ structure] | phenyl-N(C₂H₄OH)₂ | reddish blue |
| 61 | " | 3-CH₃-phenyl-N(C₂H₄OH)₂ | reddish blue |
| 62 | " | 3-Cl-phenyl-N(C₂H₄OH)₂ | violet |
| 63 | " | 3-OCH₃-phenyl-N(C₂H₄OH)₂ | reddish blue |
| 64 | " | 2-Cl, 5-HNCOCH₃-phenyl-N(C₂H₄OH)₂ | blue |
| 65 | " | 2-OCH₃, 5-HNCOCH₃-phenyl-N(C₂H₄OH)₂ | dark blue |
| 66 | " | 3-HNCOCH₂Cl-phenyl-N(C₂H₄OH)₂ | reddish blue |
| 67 | " | 3-(CH₂-phenyl-SO₃H)-phenyl-N(C₂H₄OH)₂ | reddish blue |
| 68 | " | phenyl-N(CH₂CH(OH)CH₃)₂ | reddish blue |

-continued

| No. | Diazo component | Coupling component | Hue on nylon 6 |
|---|---|---|---|
| 69 | " | ![m-sulfo-N,N-bis(2-hydroxyethyl)aniline] | violet |

The following dyes are also obtained analogously to Example 1:

| No. | Diazo component | Coupling component | Hue on nylon 6 |
|---|---|---|---|
| 70* | 3-amino-6-sulfo-1,2-benzisothiazole | 1,8-bis(methylamino-dimethyl)naphthalene derivative | blue |
| 71* | " | 2-cyclohexylamino-naphthalene | reddish blue |
| 72* | " | 2-ethylamino-naphthalene | reddish blue |
| 73* | " | 2-(2-hydroxyethylamino)-naphthalene | reddish blue |

*The coupling components are dissolved in the necessary amount of acetone.

The following dyes may be prepared analogously to Example 30:

| No. | Diazo component | Coupling component | Hue on nylon 6 |
|---|---|---|---|
| 74 | 3-amino-6-sulfo-1,2-benzisothiazole | $CH_3COCH_2CONHC_6H_5$ | red |
| 75 | " | $CH_3COCH_2CONH$—(3-Cl, 4-SO_3H-phenyl) | red |
| 76 | " | $CH_3COCH_2CONH$—(2-OCH_3-phenyl) | red |
| 77 | " | $CH_3COCH_2CONH$—(4-OCH_3-phenyl) | red |
| 78 | " | $CH_3COCH_2CONH$—(4-Cl-phenyl) | red |
| 79 | " | $CH_3COCH_2CONH$—(2-CH_3-phenyl) | red |
| 80 | " | $CH_3COCH_2CONH$—(3-CH_3, 5-SO_3H-phenyl) | red |
| 81 | " | 3-methyl-5-hydroxy-1-(4-sulfophenyl)pyrazole | bluish red |
| 82 | " | 3-methyl-5-hydroxy-1-(2-chloro-4-sulfophenyl)pyrazole | bluish red |

-continued

| No. | Diazo component | Coupling component | Hue on nylon 6 |
|---|---|---|---|
| 83 | " | 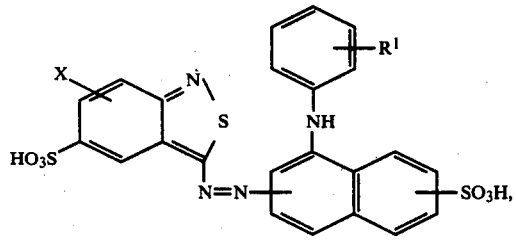 | bluish red |
| 84 | " | 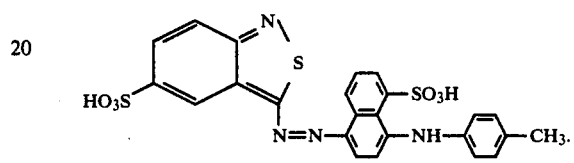 | bluish red |

We claim:

1. An acid dye which in the form of the free acid has the formula

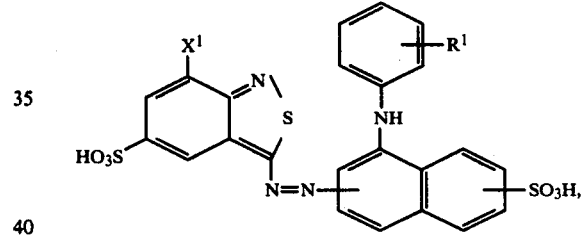

wherein:
X is hydrogen, chloro, bromo, nitro, $C_1$- to $C_4$-alkyl, methoxy, ethoxy or NHCO-($C_1$ to $C_4$-alkyl)
$R^1$ is hydrogen, chloro, methyl, methoxy or ethoxy.

2. A dye as set forth in claim 1 of the formula:

3. A dye as set forth in claim 1 wherein $R^1$ is hydrogen, methoxy or methyl.

4. A dye as set forth in claim 1 which in the form of free acid has the formula:

wherein:
$X^1$ is hydrogen, chloro or bromo.

5. A dye as set forth in claim 1 wherein $R^1$ is methoxy.
6. A dye as set forth in claim 1 wherein $R^1$ is methyl.
7. A dye as set forth in claim 1 wherein $R^1$ is hydrogen.